350-269
6/17/80 OR 4,208,103
SR

United States Patent [19] [11] 4,208,103
Kalt et al. [45] Jun. 17, 1980

[54] ELECTROSTATIC DISPLAY DEVICE

[75] Inventors: Charles G. Kalt; Thomas F. Kalt, both of Williamstown, Mass.

[73] Assignee: Dielectric Systems International, North Adams, Mass.

[21] Appl. No.: 829,821

[22] Filed: Sep. 1, 1977

[51] Int. Cl.² ........ G02F 1/19
[52] U.S. Cl. ........ 350/269; 350/360
[58] Field of Search ........ 350/266, 269, 270, 360

[56] References Cited

U.S. PATENT DOCUMENTS

| | | | |
|---|---|---|---|
| 3,553,364 | 1/1971 | Lee | 350/269 |
| 3,897,997 | 8/1975 | Kalt | 350/269 |
| 3,989,357 | 11/1976 | Kalt | 350/360 |

*Primary Examiner*—William L. Sikes
*Attorney, Agent, or Firm*—Anthony H. Handal

[57] ABSTRACT

An electrostatic display device has a closed opaque chamber with one or more transparent windows in a side thereof. Mounted within the chamber adjacent to each window is a resilient electrode that is capable of moving so as to block the adjacent window or to withdraw from the window in response to a signal voltage that is applied between the resilient electrode and a fixed electrode. The total window area is less than about 20% of the exterior surface area of the chamber so that an "open" window functions optically as a light sink and appears dark. The outer surface of the resilient electrode may be of a bright hue for optical contrast in a normally bright "day time" ambient. Alternatively a lamp within the chamber provides an electrically actuated display that is visible in a dark ambient.

22 Claims, 9 Drawing Figures

ELECTROSTATIC DISPLAY DEVICE

BACKGROUND OF THE INVENTION

This invention relates to electrostatic devices for the gating of light, and more particularly to such devices having an electrostatically actuated resilient electrode and a fixed electrode for use as a display device.

Such electrostatic devices having a curved fixed electrode and an adjacent resilient sheet electrode are described in my U.S. Pat. No. 3,897,997 issued Aug. 5, 1975 and in my application Ser. No. 711,710 filed Aug. 4, 1976. These devices permit the change in appearance of the fixed electrode from a dark to a light hue, or visa versa, by application of appropriate electrical signals.

Other electrostatic devices have a variable electrode that is at rest in the form of a spiral roll. It unrolls upon being attracted electrostatically to an adjacent fixed electrode which fixed electrode may be a transparent plate. Such rolling electrode devices are described in U.S. Pat. No. 3,989,357 issued Nov. 2, 1976.

It is an object of this invention to provide an improved electrostatic display device having a sharply defined window area that is capable of changing from a dark to a light hue in response to an electrical signal.

SUMMARY OF THE INVENTION

An electrostatic device of the class having fixed and variable electrodes wherein the variable electrode is caused to move toward and become coadunate with the fixed electrode when a voltage is applied between the fixed and variable electrodes, is mounted within a chamber having a light transparent window in one side thereof. One portion of the variable electrode is mounted near an edge of the window and the other projects over the window to block light from being transmitted through the window for a predetermined range of voltages. The outer surface of the variable electrode has a bright hue, for example white or shiny-metallic. When the window is not blocked by the variable electrode, the open window condition, a high percentage of the ambient light entering the window is diffused and absorbed by the interior walls of the chamber. Thus the open window appears dark.

The exterior of the window-side in the region adjacent to the window may be dark or may be bright. When it is of the bright hue of the variable electrode and the variable electrode is in the window-blocking position, the outline of the window is essentially obscured and not visible, but when the variable electrode withdraws from the window, the window appears dark and the window is clearly visible.

On the other hand when the exterior of the window-side is dark and the variable electrode blocks the transmission of light through the window, then the bright exterior hue of the variable electrode shows through the window, clearly standing out from the surrounding dark exterior of the window side. Withdrawal of the variable electrode away from the window renders the window dark and indiscernable.

Other windows may be formed in the window-side, each having the same relationship to another adjacent electrostatic device. For example such devices may have seven windows arranged in a standard numeric display configuration wherein each window may be "opened" or "closed" individually by application of appropriate electrical signals thereto.

One structure of the device of this invention includes a fixed electrode that is mounted within the chamber adjacent an edge of the window. This electrode has a curved cylindrical surface portion the axis or axes of which are parallel to the window edge. A variable electrode of a resilient sheet material has one end mounted within the chamber and the other end extends over and blocks the window. The outer surface of the variable electrode has a bright hue. An insulative layer may be bonded to the fixed or to the variable electrode but in any case is positioned between the fixed and variable electrodes. Two electrical terminals are connected to the two electrodes, respectively.

In this structure it is especially preferred to provide a slight curvature in the extending portion of the variable electrode at rest, which curvature is convex toward the fixed electrode. The variable electrode will be at rest and blocking the window when no voltage (or too small a voltage to actuate the variable electrode) is applied between the two electrodes. This slight curvature has the effect of biasing a central portion of the variable electrode against the curved surface of the fixed electrode (through the insulating layer) to assure a stable and low minimum voltage capable of actuating the variable electrode while at the same time assuring the blocking of the window for any physical orientation of the chamber.

In another display device of this invention including a closed opaque chamber with at least one window in one side thereof, the interior surface of this one side is conductive and serves as a fixed electrode. A conductive resilient sheet serves as a variable electrode and is curled in the shape of a spiral coil or a portion of a spiral coil. This curled electrode is mounted near one end thereof adjacent an edge of the window so that at rest it does not block the transmission of light through the window. An insulative layer is positioned between the fixed and variable electrodes, preferably consisting in an insulative coating applied to the fixed electrode. When a voltage is applied between the fixed and variable electrodes, the variable electrode is electrostatically attracted to the fixed electrode subsequently uncurling and covering the window, blocking the transmission of light therethrough.

In the above described embodiments it is preferred to provide a chamber that completely encloses the electrostatic window-shade mechanism, and which chamber is opaque except for the window or windows to avoid admitting light into the chamber except through the windows that are "open." It is also preferred that all interior surfaces of the chamber, except for the window areas, be of a dark hue to provide an efficient light sink, for light that is transmitted through an "open window" into the chamber. Both of these features lead to an optimally dark or black appearance of the "open" windows and enhance the contrast between an "open" window and the bright hue of adjacent window-side surface regions and/or the front exterior surfaces of the variable electrode.

However, even when the interior surfaces are of a bright hue a small open window appears rather dark compared to a similarly bright exterior surface and the hue of the interior chamber surfaces is thus not critical.

For operation in a dark ambient, a source of light may be provided inside the chamber. Open windows in the mode of operation appear bright against the outer surfaces of the chamber that are not illuminated. It is preferred in devices for operation in both a dark ambient (internally illuminated) and in a bright ambient (not internally illuminated) that the interior chamber surfaces have a hue intermediate between very dark and very bright.

It is preferred that the completely enclosed chamber be sealed closed against the entry of atmospheric dust. Such dust particles tend to be electrostatically charged and are attracted to the surfaces of the fixed and variable electrodes. This in turn leads to an unwanted erratic behavior of electrodes which typically increases the voltage necessary to operate it.

DESCRIPTION OF THE PREFERRED EMBODIMENTS

Figure 1:
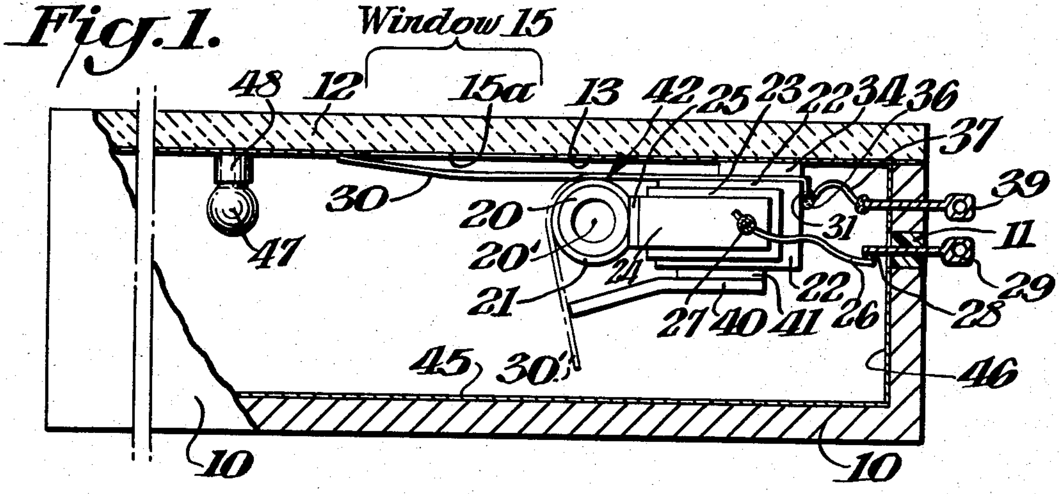
FIG. 1 shows in side view a portion of an electrostatic display device of this invention with the chamber broken away to reveal the internal construction.
Figure 2:
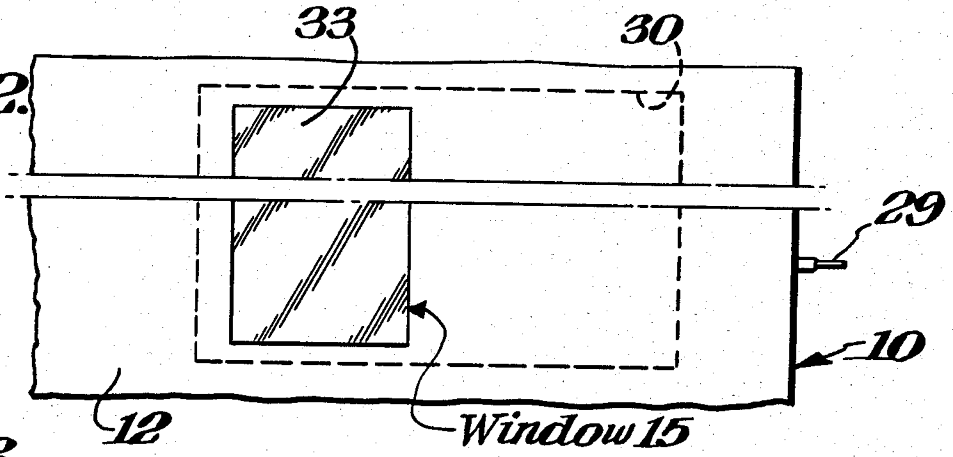
FIG. 2 shows a detail in a top view of the device of FIG. 1.

The display device of FIG. 1 is shown oriented for viewing from the top of the Figure, for example as it may lie on a table (not shown). The chamber 10 consists of a five side opaque metal case and a transparent glass cover side 12 completing the enclosure. The inner surface of the glass side 12 is coated with an electrically conducting opaque paint 13, except in a rectangular window region 15. The glass side 12 may have other windows in the paint coating 13 (not shown).

Figure 4:
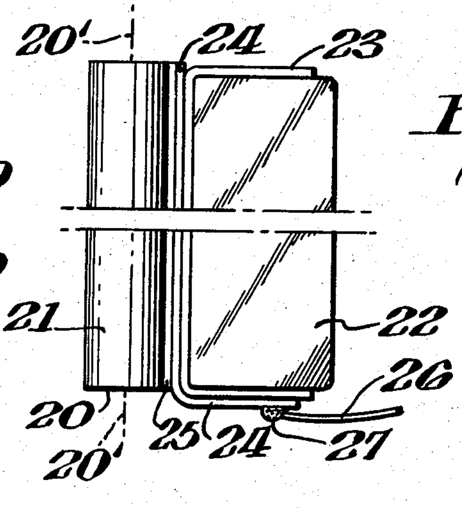
FIG. 4 shows a detail in bottom view of the fixed electrode and mounting block assembly of the device of FIG. 1, the stop having been removed.

An electrodes assembly is mounted within the closed chamber 10, and comprises a 0.125 inch (0.318 cm) diameter aluminum tube serving as the fixed electrode 20 having an insulative coating 21 adhered to the outer curved surface thereof. An aluminum mounting block 22, most clearly seen in FIG. 4 has a piece of insulative polyethyleneterephthalate (Mylar) adhesive tape 23 covering an outer periphery thereof and a copper foil 24 being wrapped part way over the tape and about the block to which it is bonded.

The tubular fixed electrode 20 and the overlying insulative coating 21 is milled or abraded on one side to provide a bare surface exposing the aluminum metal of the tube 20, which bare side is bonded to the copper foil 24 by means of a conductive epoxy 25. A length of copper wire 26 is attached by solder joints 27 and 28, respectively, to an externally accessible terminal 29 that is mounted through insulative plug 11 in the side of the chamber 10.

Figure 3:
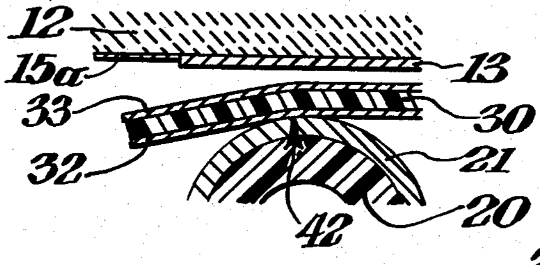
FIG. 3 shows a side sectional detail of the region of tangency between the fixed and variable electrodes of the device of FIG. 1.

A composite variable electrode consists of a sheet 30 of polyethyleneterephthalate about 0.00013 inch (0.00035 cm) thick having deposited on both sides thereof films 32 and 33, respectively by, of aluminum that are approximately 500 angstroms thick, as seen in FIG. 3. The film 32 serves in this structure as the variable electrode, but the composite (30, 32 and 33) may be replaced by a solid metal foil. The aluminum films 32 and 33 are connected at the tab portion 31 by a conductive resin joint 36 to wire 37 leading to an externally accessible terminal 39.

Figure 5:
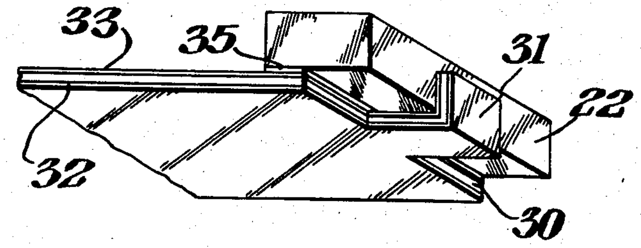
FIG. 5 shows in enlarged perspective view the electrode mounting block of FIG. 1 with the variable electrode attached.
Figure 6:
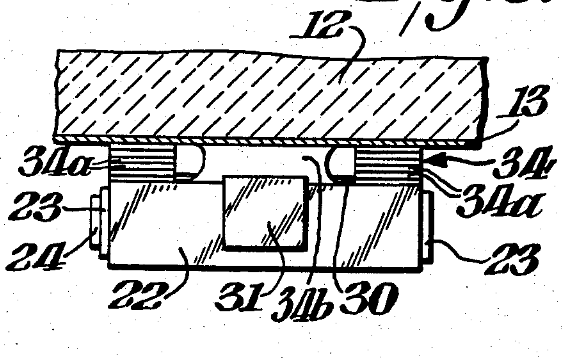
FIG. 6 shows a magnified detail in end view of the electrode mounting block of FIG. 1 mounted to the interior surface of the top side of the chamber.

In FIG. 5, an end portion of the composite 30/32/33 is shown flush mounted to a surface of the block 22 by means of a film of glue 35. A tab portion 31 of the composite is bent around an edge of this surface. The block 22 is then mounted on the interior surface of the glass top 12 as illustrated in the detail of FIG. 6. A stack of adhesive tapes **34*a* is provided on two sides (left and right as shown) of the opposite surface of the block from the mounted variable electrode. These stacks of tape provide a shim about 0.01 inch (0.025 cm) thick. A small quantity of conductive epoxy is applied to the block in a region between the stacks and the block is positioned against side 12. The epoxy layer 34*b* is cured to bond and electrically connect the block to the conductive layer 13, leaving the bent tab portion 31 free for subsequent contact by lead wire 37** of FIG. 1.

When a voltage is applied between terminals 29 and 39 that exceeds about 90 volts (the voltage threshold of this device), the variable electrode is electrostatically drawn toward the fixed electrode 20 and away from the window 15. When the free extending portion of the variable electrode composite has traveled through a little more than 90 degrees of arc, this composite electrode is stopped as indicated by dotted line 30' in FIG. 1 by a physical stop member 40 which is mounted through pad 41 to the bottom of block 22. The stop 40 and pad 41 are conveniently made of metal and are thus electrically connected through block 22 to the variable electrode. Thus there is no potential difference under any circumstances between the activated variable composite electrode (30') and the stop 40.

An important feature of this embodiment that is illustrated in FIG. 1, is the shape of the variable electrode indicated by layer 30 at rest. This electrode has a slight curvature, being convex inwardly or toward the fixed electrode. The most remote edge (left most as shown) is biased or spring loaded against the side 12 and a central portion of the variable electrode is biased against the fixed electrode (through the coating 21) at which it forms a line of tangency 42 (seen as a point in end view in FIGS. 1 and 3). Thus the extending portions of the variable electrode are physically stable, being independent of the positions in which the display device may be placed and insensitive to mechanical vibration. Even more importantly, the variable electrode is assured of close proximity with the fixed electrode determined only by the thickness of layer 21, and the voltage threshold for activation of the device remains constant at its lowest possible value. This feature not only stabilizes the voltage threshold or sensitivity of the device with respect to physical orientation, but also with respect to hours of service, temperature and other related conditions.

Figure 7:
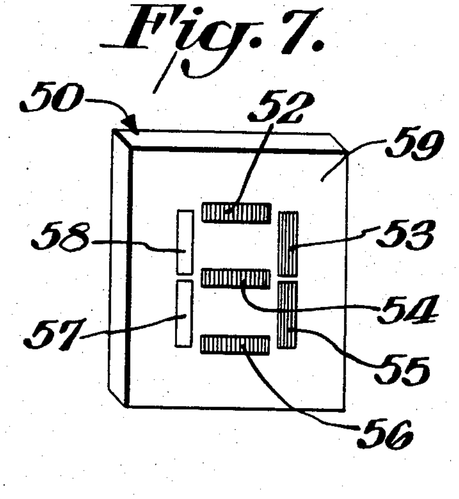
FIG. 7 shows in a perspective view a 7 element numeric display device of this invention displaying the numeral "3."

The seven windows 52 through 58 of a seven element numeric display assembly is shown in FIG. 7. Associated with each window is an electrodes assembly, similar to that described above and shown in FIGS. 1–6. A single chamber 50 encloses all seven of the above said electrodes-assemblies (not seen). Windows 52 through 56 are shown "open," i.e. the corresponding variable electrodes are withdrawn so that the ambient light is transmitted through the window and is diffused and experiences multiple reflections until being mostly absorbed by the interior walls of the chamber. The windows 57 and 58 are shown bright, these windows being covered by the corresponding variable electrodes which have a bright exterior hue similar to that of the exterior window-side 59 of the chamber.

Figure 8:
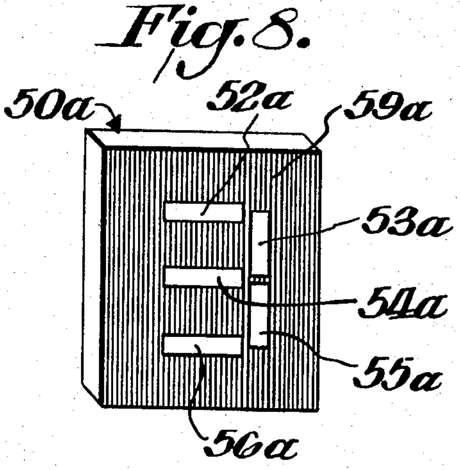
FIG. 8 shows in a perspective view another 7 element numeric display device of this invention, displaying the numeral "3."

FIG. 8 shows a seven element numeric display assembly having the same structural features as that of FIG. 7, except that the exterior of the window-side 59*a* has a dark hue and the variable electrodes associated with each window 52*a*–58*a* is in the opposite position to corresponding axes of FIG. 7.

Figure 9:
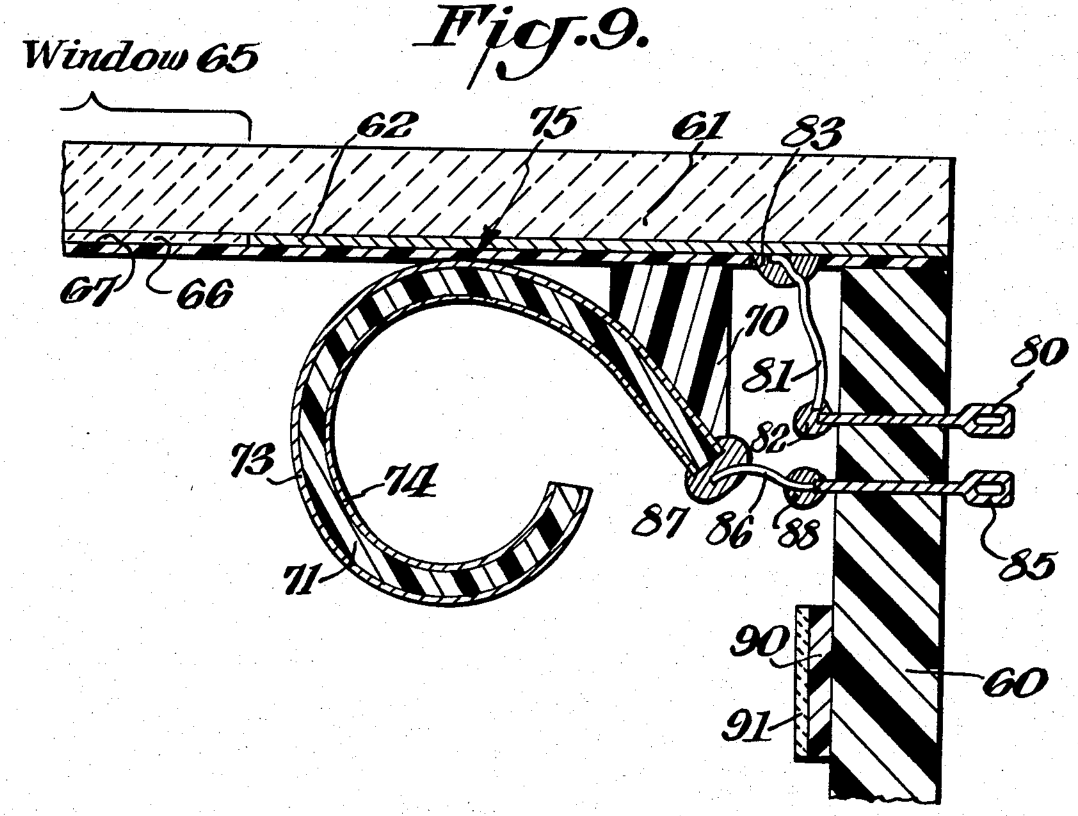
FIG. 9 shows in side sectional view a portion of another electrostatic display device of this invention.

In a second preferred embodiment, illustrated in FIG. 9, a chamber consists of a rectangular opaque plastic box 60 having one side open, and a glass plate 61 covering the open side of the box. The glass plate is coated on the inside surface with a black conductive paint 62 consisting of graphite particles held in a resin binder. A rectangular opening in the opaque graphite coating provides a transparent window 65 and the inner surface of the glass plate in this window region is coated with a transparent conductive coating 66 of tin oxide that is in electrical contact with the graphite coating 62. These conductive coatings serve together as the fixed electrode of the electrostatically controlled "window-shade" of this device as will be further explained. An insulative coating 67 overlies layers 62 and 66.

An insulative mounting block 70 is physically bonded to the inner surface of the glass plate 61. A surface of the block opposite to the glass-plate-mounted surface thereof is sloped toward the window 65, and a resilient sheet 71 is bonded to this sloped block surface. The sheet 71 is 0.00013 inch (0.00035 cm) thick plastic (polyethyleneterephthalate) and has aluminum films 73 and 74 on the major opposing surfaces thereof. The aluminum film 73 may serve alone as the variable electrode of this device. Film 73 also serves to impart a bright blue hue to the exterior surface of the variable electrode.

An extending portion of the metallized plastic sheet 71 is curled; that is, it has the shape of a cylindrical roll which curvature may be set into the plastic by wrapping this extended sheet portion about a mandrel and heating to about 100° C. for a few minutes. This is conveniently accomplished with the sheet 71 already bonded to block 70. After permanently curling the sheet, the block 70 is bonded to the plate 61 using for example a liquid room-temperature-curing epoxy. These steps are carried out so that the sheet is spring loaded and biased against the coated surface of glass plate 61 through layers 62 and 67, and is tangent at a line 75 (seen in end view at the tip of the arrow). This tangent line 75 is parallel to the adjacent edge of the rectangular window 65.

The fixed electrode 62/66 and the variable electrode 73 are connected by wires 81 and 86 to externally accessible terminals 80 and 85, respectively. Wire 81 is joined through an opening in layer 67 to layer 62 by a conductive epoxy joint 83. A solder joint 82 connects copper wire 81 to terminal 80. Wire 86 is connected to aluminum layers 73 and 74 by conductive resin joint 87. Solder joint 88 effects connection of wire 86 to terminal 85.

It is notable that a window in the device of FIG. 9 is normally "open" in constrast to the normally "closed" windows of the device of FIG. 1.

It is important to close and seal the chamber in a relatively dust free atmosphere. Furthermore, a dust-getter may be installed inside the chamber. Such a dust getter is shown in FIG. 9, consisting of a piece of tape 90 having a sticky adhesive layer 91. The adhesive layer 91 serves to collect and hold the dust that settles on its surface. The turbulence created within the chamber by the action of the variable electrodes tends to disperse the residual dust particles and the getter soon reduces the dust density within the chamber to very low levels.

An unwanted electrode "sticking" mode has been observed. When the interposed insulative layer, e.g. 21 in FIG. 1, is of very high quality, namely having a very low electrical conductivity, electrical charges are induced in the surface or just below the surface of the insulative layer and they may leak away through the high resistance of this layer very slowly. The light transparent window, whether of glass or of a plastic material also exhibits the same phenomena. It has been found that this problem may be completely eliminated by either employing an insulative material having only a moderately high conductivity, e.g. 100 ohm-centimeters. It is known to make semiconducting glasses by firing in an atmosphere that is either reducing or has a reduced oxygen content. Certain organic resin materials are also semiconducting and others are rendered slightly conducting by additions in their formulations of fine conductive particles. Otherwise, a coating of a slightly conducting material may be applied to the outer surface of a high resistivity insulator. Such coatings include a variety of quaternary salts for rendering surface of the insulative layer "antistatic" by bleeding away any accumulated charge. The well known commercial window washing solution called WINDEX, Tradename of the Drackett Co., Cincinatti, Ohio is found to work well. Another suitable material is Meric Anti Static Concentrate #79.

Another source of sticking may be called pneumatic sticking and is alleviated by providing a rough mating surface, or interface between the fixed and variable electrodes as is more fully explained in the aforesaid patents U.S. Pat. Nos. 3,897,997 and 3,989,357 which patents are incorporated by reference herein.

The above incorporated patents also describe the threshold voltage, $V_t$, which is the minimum applied voltage to actuate the variable electrode. The ange of voltages below $V_t$ correspond to one terminal position of the variable electrode, e.g. 30 in FIG. 1. Voltages above $V_t$ correspond (absent the hysteresis voltage) to the other terminal position of the variable electrode, e.g. 30′ in FIG. 1.

The description thus far given of the operating principles of the display device of FIG. 1 presumes that there is present an external source of light whereby the "closed" window appears bright in this ambient light and the "open" window is dark. Another mode of operation is made possible when there is no ambient light by providing internal to the chamber a source of artificial light. Such a source is provided by the incandescent lamp 47 that is mounted within the chamber by the base or socket 48. For operation in this mode, it is preferable that the interior surfaces of the chamber have an intermediate hue between bright and dark.

Consider for example the numeric display device of FIG. 7 having an external window-side surface that is bright. When the ambient become dark, an interior lamp may be switched on and the numeral 3 now is brightly illuminated from within.

The particular display devices illustrated in FIGS. 1 and 9 employ a window side of a transparent material. The hue of the exterior surfaces of these sides in regions adjacent to the window areas is determined by the hue of the coatings (e.g. 13 in FIG. 1) adhered to the inner surfaces of the transparent window side. However, other means for constructing the window will readily be devised. For example the window side may be of any opaque material that has holes forming the windows and a transparent material may be inset in the holes.

Light entering the window(s) is diffused by the walls and after many reflections is ultimately absorbed by the interior walls except for a minor percentage that escapes through the window(s). Thus an open window functions as a light-sink and has a dark hue as seen by the observer when the total open window area is a small percentage of the total interior wall area of the chamber, preferably 20 percent or less.

In general, a fixed electrode (e.g. 20) of devices such as that shown in FIG. 1 has a convex cylindrical surface portion to which the variable electrode is initially tangent and to which the variable electrode may be coadunately drawn by application of a voltage therebetween. In this regard, it should be kept in mind that a cylindrical surface is one that is generated by a line which moves so as to be parallel to its original position. When, as illustrated in the particular fixed electrode 20 of FIG. 1, this imaginary line moves at a constant radius about a single axis 20′, forms a circular cylinder. However, in the more generic sense, the cylindrically curved portion of the fixed electrode of this invention may not have a fixed radius and may thus have an infinite number of parallel axes of curvature, each associated with a particular infinitesimal area of the curved cylindrical surface (not illustrated). The light sinking function of an open window of the above described display devices is enhanced when the inner and outer surfaces of the transparent material in the window region are etched or otherwise provided with a fine pattern of light diffusing undulations This renders these surfaces glare free and the appearance of the window in an environment of bright external light is made more uniform for all viewing angles. The uniformity of appearance of an internally lighted device having an open window is likewise improved.

What is claimed is:

1. An electrostatic device of the class having a fixed electrode, a variable resilient sheet electrode and an insulative layer positioned therebetween wherein the application of a voltage between said two electrodes causes a portion of said variable electrode to move toward and become coadunate with said fixed electrode, the improvement comprising a closed chamber containing said electrodes, said chamber having at least one light-transparent window in one otherwise opaque side thereof the other sides of said chamber being opaque, a variable electrode mounting means for mounting one end of said variable electrode adjacent to said window for blocking light from being transmitted through said window for a predetermined range of said applied voltage, and for permitting light to be transmitted through said window for another predetermined range to said voltage.

2. The device of claim 1 wherein the exterior region of said one side that is adjacent to said window has a bright hue and the outer surface of said variable electrode has a bright hue.

3. The device of claim 1 wherein the exterior region of said one side that is adjacent to said window has a dark hue and the outer surface of said variable electrode has a bright hue.

4. The device of claim 1, wherein said one side has at least another window, and additionally comprising within said chamber at least another fixed electrode, variable electrode, insulative layer and pair of electrical terminals, said at least another elements having the same mutual relationship to each other as for the corresponding elements recited in claim 1.

5. The device of claim 4 having seven windows wherein said windows form a standard seven segment configuration of a numeric display device.

6. The device of claim 1 wherein said one side is a plate of transparent material and additionally comprising an opaque coating over the inner surface of said one side, said coating having at least one opening therein to form said at least one window.

7. The device of claim 6 wherein said coating is an electrically conductive coating.

8. The device of claim 7 additionally comprising a light transparent electrically conductive film on the inner surface of said one side in said window region.

9. The device of claim 8 wherein said film is in electrical contact with said conducting coating.

10. The device of claim 1 wherein the surfaces of said transparent material in the region of said window have fine light-diffusing undulations formed therein to render said window glare-free.

11. The device of claim 1 additionally comprising an illumination means internal to said chamber for the purpose of transmitting light outwardly through said window when said voltage is within said another range whereby said window is clearly visible in a dark ambient.

12. The device of claim 1 additionally comprising within said chamber a dust getter means for the purpose of collecting dust particles from the interior atmosphere of said chamber.

13. An electrostatic display device comprising:

(a) an opaque chamber having at least one transparent essentially rectangular window in onw side thereof;

(b) a fixed electrode being mounted within said chamber adjacent to an edge of said window, said fixed electrode having a cylindrically curved surface portion the axes of which are substantially parallel to said edge;

(c) a variable electrode of a resilient opaque sheet material being mounted at one end thereof within said chamber and, extending from said one mounted end to a line of tangency with said curved surface, said line of tangency being located between said one side and said curved surface, said variable electrode further extending over said window to block the transmission of light through said window; the outer surface of said variable electrode having a bright hue;

(d) an insulative layer being positioned between said fixed and variable electrodes; and (e) two electrical terminals being connected to said variable and said fixed electrodes, respectively, so that when a voltage is applied between said terminals said variable electrode is electrostatically drawn toward said fixed electrode away from said window to permit the transmission of light therethrough.

14. The device of claim 13 wherein said extending portions of said variable electrode at rest have a slight curvature that is convex toward said fixed electrode, the most remote edge of said extending variable electrode being biased against said one side and a central portion of said variable electrode being biased against said fixed electrode at said line of tangency.

15. The device of claim 14 additionally comprising a mechanical stop means to stop the travel of said variable electrode when said electrical voltage is applied and prior to its having become completely coadunate with said fixed electrode.

16. The device of claim 15 wherein said stop means is for the additional purpose of limiting the arc traversed by said further extending portion of said variable electrode to the range of about 90° to 120°.

17. The device of claim 13 wherein said one side is a plate of transparent material and additionally comprising an electrically conductive opaque coating on the interior surface of said one side, said coating having at least one opening therein to form said at least one window.

18. The device of claim 17 wherein said variable electrode is electrically connected to said conductive coating.

19. An electrostatic display device comprising:

(a) a closed opaque chamber having at least one transparent window in one side thereof, the interior surface of said one side in the region of said window being electrically conductive, whereby said conductive surface serves as a fixed electrode;

(b) a variable electrode of a resilient opaque sheet material being mounted at one end thereof within said chamber adjacent to said window and said variable electrode having at rest the cylindrical shape of a spiral roll, so that the other end portion of said variable electrode is capable of unrolling over said window;

(c) an insulative layer being positioned between said fixed and variable electrodes, said roll of said variable electrode being spaced from said fixed electrode by said insulative layer at a line of tangency therebetween; and (d) two electrical terminals being connected to said variable and said fixed electrodes, respectively, so that when a voltage is applied between said terminals, said variable electrode is electrostatically drawn toward and unrolls over said fixed electrode to block the transmission of light therethrough.

20. The device of claim 19, wherein said one side is a plate of transparent material, additionally comprising an electrically conductive opaque coating on said interior surface of said one side, said coating having at least one opening therein to form said at least one window and to partially impart to said interior surface said electrically conductive character.

21. The device of claim 20 additionally comprising a transparent electrically conductive film in the window region of said interior surface that is in electrical contact with said coating, said film and said coating serving as said fixed electrode.

22. The device of claim 21 wherein said insulative layer is transparent and is bonded to said coatings.

* * * * *